Sam'l. J. Sherman,
Harvester Rake.
No. 53051   Patented Mar. 6. 1866
2 Sheets. Sheet 1.
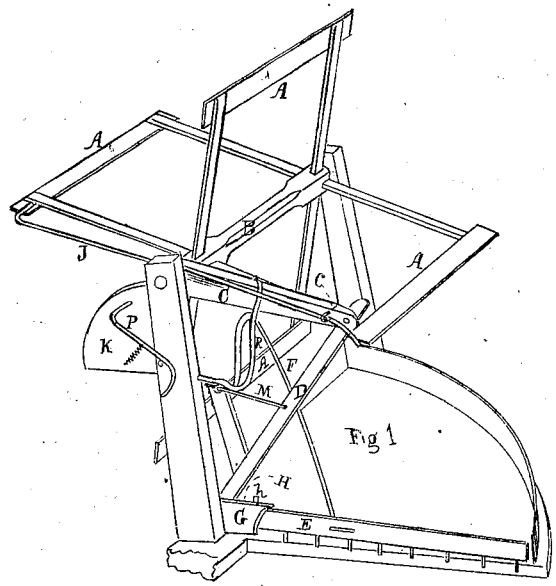
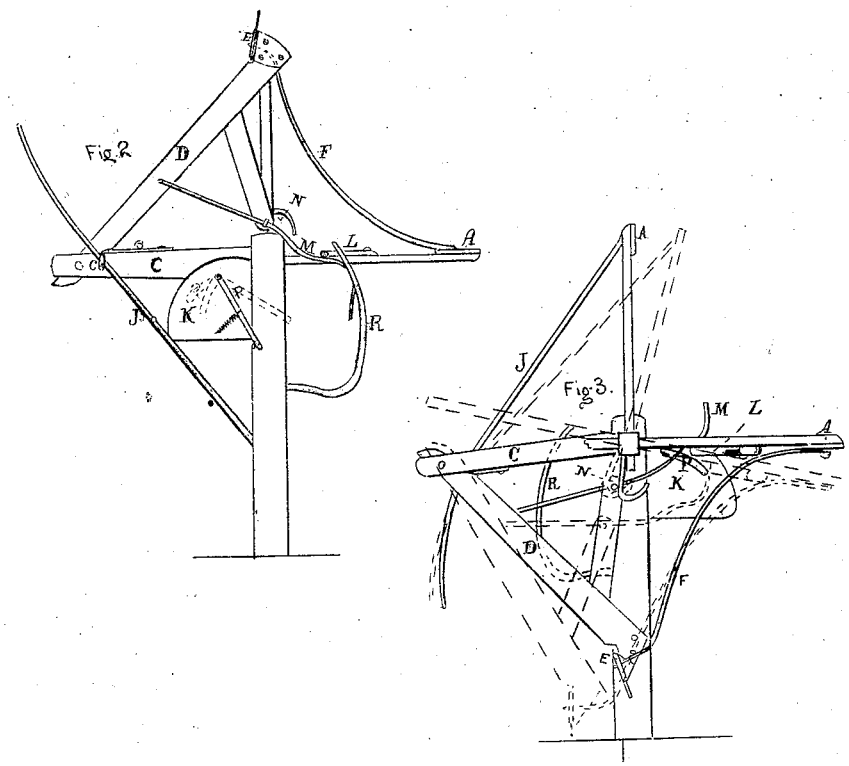
Witnesses
B F Fields
Inventors
Sam'l Sherman
Jeremiah Sherman
By their atty R D O Smith S. and J. Sherman.
Harvester Rake.

No. 53051

Patented Mar. 6. 1866

Witnesses.

Inventors
Saml Sherman
Ishmael Sherman
By their Atty

UNITED STATES PATENT OFFICE.

SAMUEL S. SHERMAN AND JEREMIAH G. SHERMAN, OF McHENRY, ILL.

IMPROVEMENT IN HARVESTER-RAKES.

Specification forming part of Letters Patent No. 53,051, dated March 6, 1866.

*To all whom it may concern:*

Be it known that we, SAMUEL S. SHERMAN and JEREMIAH G. SHERMAN, of the town and county of McHenry and State of Illinois, have invented a new and useful Improvement in Automatic Rakes for Harvesting-Machines; and we do hereby declare the following to be a full, clear, and exact description thereof, reference being had to the accompanying drawings, in which—

Figure 4:
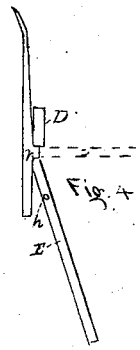
Figure 6:
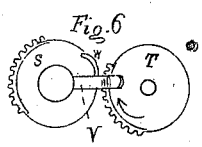
Figure 7:
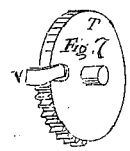

Figure 1 is a perspective view of our improved rakes in operation. Fig. 2 is an end elevation of the same. Fig. 3 is a section, showing an elevation of the inner sides of the same parts represented in Fig. 2. Fig. 4 is a plan of the check-plate and a portion of the rake-head. Figs. 5, 6, 7, 8, 9, 10, and 11 represent modifications in the mode of operating the rake and illustrate its movements.

Our invention belongs to that class of automatic rakes which revolve with and are operated by the mechanism which moves the reel; and it consists in such a novel construction of parts that the rake is enabled to revolve with the reel, and also to operate upon a quadrant-shaped platform, sweeping the grain therefrom heads foremost, endwise, and sidewise in the arc of a circle, so as to leave a clear space for the passage of the machine during the next round.

That others may understand the construction and operation of our machine we will more particularly describe it.

A A A A are the wings of the reel, and may be made in any of the ordinary methods.

Upon the inner end of the reel-axle B is hinged an arm, C, the end of the axle B passing through a sleeve or socket on the end of C, so that said arm may have a vibratory motion on its axis.

At its outer end the arm C is jointed to the arm D, and to the outer end of this latter is jointed the rake-head E. The rake-head E is, for convenience, connected with one of the wings of the reel by the connecting-rod or pitman F, and the rake is thereby caused to operate in the desired manner, sweeping the grain from the platform as described.

The platform to be used with our rake is the ordinary quadrant-platform, to any of which it is adapted.

Upon the inner side of the platform, or nearest the driving mechanism, is the guard-board G, and upon its upper edge is the check-plate H, (see Figs. 1, 4, 9, 10, and 11,) which serves to hold the inner end of the rake while the outer end of the same is sweeping the grain from the platform.

Figure 11:
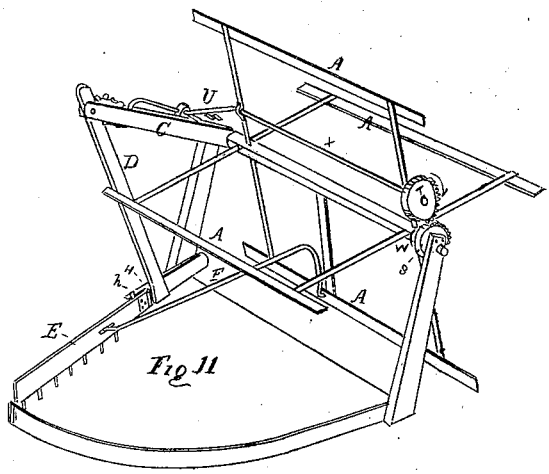
Figure 10:
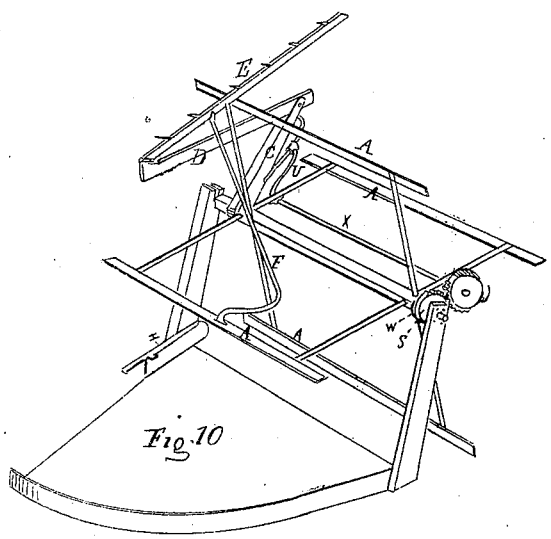
Figure 5:
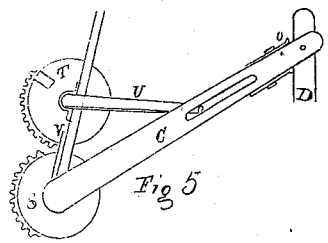
Figure 9:
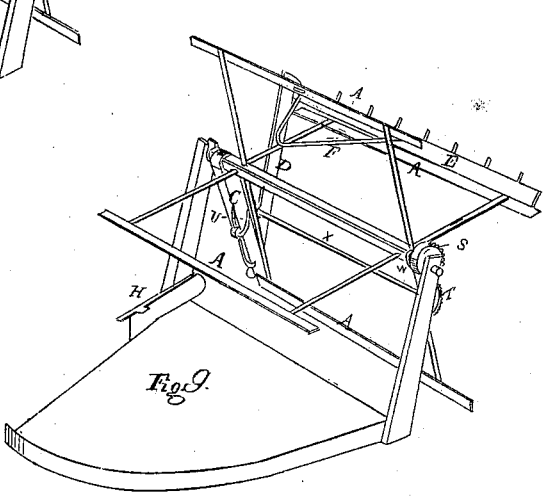

The normal position of the rake is shown in Figs. 2 and 9. The rake-head E there lies extended along the edge of one of the reel-wings, and is maintained in that position during a portion of the revolution of the reel, or until the rake reaches a position about over the finger-bar, when it is released and drops upon the platform, and is immediately pushed backward and around by the pitman F until it has moved through about one-fourth of a circle, when it is again retracted and folded upon the reel, as shown in Figs. 2 and 9, to be there retained until the proper moment for it to be again released.

I will now describe the devices and their operation by which this complex movement of the rake is effected.

Suppose the rake to be in the position shown in Fig. 1, having just removed its gavel from the platform. At the outer end of the arm C is a staple, $c$, through which the rod J passes. This rod may slide freely in the staple $c$, but at its other end it must be secured to some part of the machine which revolves freely with the reel, and for convenience it may be secured, as represented, to one of the reel-wings. When in the position shown in Fig. 1, the rake then being extended to its utmost, the rod J lies along parallel to the arm C, and secured to the reel-wing, which is then directly opposite. At this moment the rake-head E is freed from the check-plate H, and as the reel continues to revolve the rake is raised up from the platform, without, however, changing its relative position with the reel, until the rod J begins to pass over the cam K, which has the effect to raise up the rod J, so that instead of lying parallel with a radius of the reel it becomes about parallel with a chord, connecting the two ends of the reel-wings or radii at right angles to each other. It is then in the position shown in Fig. 2, and has raised the outer end of the arm C with it. As that part of the rake-head containing the joint of the pitman is always and necessarily at the same distance from that wing of the reel to which the other end of the pitman is attached, it follows that as the end of the arm C and rake-head E is raised up, the rake-head is drawn by the pitman more and more over toward that wing of the reel upon which it is to be folded until the position shown in Fig. 2 is reached. When folded in the position shown in Fig. 2 the rake and arms C and D are retained there by any suitable device which may be made to catch and release automatically. For this purpose I use a latch, L, in connection with a holding-rod, M, and pin and shoulder N.

With these parts thus arranged (see Fig. 2) it will be seen that, first, the arm D cannot move any farther toward the arm C because the metallic slide O interposes and limits the movements of the arms C and D toward each other. This slide may be adjusted so as to allow a greater or less amount of motion at the joint connecting the arms C and D, as may be desired; second, the arm D cannot rise up or move away from the arm C, because the latch L retains the holding-rod M; third, the arms C and D cannot move together backward because the pin and shoulder N interpose in that direction; fourth, the arms C and D cannot move forward together because the latch L retains the rod M, as before stated.

Now, without the interposition of any other device the rake and reel would continue to revolve together, and the former would never be released to remove the cut grain from the platform. I therefore introduce, by preference, two cams, P and R. The cam P is movable for the purpose of making it possible to use the rake or not at the pleasure of the attendant, as when the grain is very thin the time occupied by two or three revolutions of the reel may be required to collect a sufficient gavel upon the platform. As the reel revolves just at the time when the rake is descending and is nearly vertical to the cutters, the latch L comes in contact with the cam P, as seen in Fig. 3, and the latch is thereby pushed aside so as to release the rod M, which at this stage alone supports the rake. As soon as the latch L is removed the rake falls by its own weight upon the platform, as shown by red lines in Fig. 3. The rake being now freed from the reel remains upon the platform, but as the reel revolves the pitman F pushes the rake backward in a direct line until the arm D engages with the check-plate H, Fig. 4, which retains said arm and that end of the rake-head hinged thereto, while the pitman F continues to urge the rake and forces it to sweep around the axis of its hinge in the manner shown. Just as the edge of the platform is reached, the pin $h$, on the upper edge of the rake-head, comes in contact with the edge of the check-plate H, and instantly constitutes itself a center of motion or axis instead of the hinge, so that the end of the arm D and its hinge is pried away from the check-plate, and is thereby released. The moment of said release is represented in Fig. 1, where the lever or rod J is seen lying along the upper edge of the arm C, and about to engage with the cam K, by means of which the arms C and D will be raised up to the position shown in Figs. 2 and 3. About the time when the arms C and D are completely raised up, as shown, the latch L engages with the concave side of the cam R, and is pushed in over the rod M, as seen in Fig. 2. This completes the circuit.

The rake is released by the cam P and falls by its own weight upon the platform, is pushed backward a short distance, and the arm D being arrested by the check-plate, the rake sweeps around in the arc of a circle and releases the arm D from the check. The rod J then engages with the cam K, and the arms C and D are raised up, the rake being drawn over and folded at the same time by the pitman F. The cam R replaces the latch L, which, in connection with the pin and shoulder N and slide O, retains securely the rake in its normal position until again released. If the grain is thin the attendant, by elevating the end of the lever of the cam P, as shown by red in Figs. 2 and 3, removes the cam so that the latch L passes over it and is not disengaged from the rod M, so that the rake is not released, and this may be repeated as often as may be necessary.

In Figs. 5, 6, 7, 8, 9, 10, and 11 is shown another method of operating the rake according to our invention. A stationary segment-gear, S, is attached to one of the reel-posts, while another and similar segment-gear, T, is attached to the reel. Upon the shaft X of this latter is a crank and wrist, U. Commencing with the position shown in Fig. 11, we see the rake fully extended and ready to be withdrawn and the segment-gears S and T about to engage. The effect of the gear S upon the gear T is that of the sun and planet wheels. The gear T is revolved in the direction of the black arrow. The crank U being moved faster than the reel in consequence of the revolution of the gear T, lifts the rake up and causes it to be folded over in exactly the same way as that already described. When the rake is perfectly folded and the gears about to disengage, the latch V, Figs. 5, 6, and 7, drops into its proper notch and retains the rake in that position until at the proper moment the cam W raises the latch V, and the rake falls by its own weight, as before described. Thus it will be seen that the rake being released at the proper moment drops upon the platform and is extended, as described, thereby, as it were, lagging behind the reel, drawing the crank U backward, and revolving the segment-gear T in the same way. When the rake has been fully extended the gears engage, and it is retracted and caught by the latch, and so on during each revolution.

Figure 8:
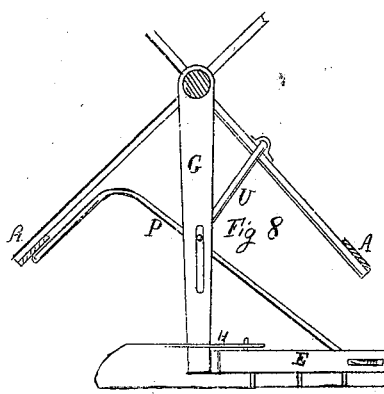

Fig. 8 represents a modified arrangement, in which the rake E is placed directly at the end of the arm C. This method has some advantages, and is applicable to a machine which may have a very short platform, or one having no gearing, or other impediments, requiring the grain to be carried directly backward a short distance before being swept around in the arc of a circle, for it is evident that with this arrangement it is necessary that the pivot-point around which the rake moves when sweeping the grain from the platform must be vertically beneath the axis of revolution of the rake and reel.

Having described our invention, what we claim as new, and desire to secure by Letters Patent, is—

1. In combination with the rake E and arm C, the lever J, cam K, and connecting-rod F, for the purpose and in the manner substantially as described.

2. In combination with the rake E, the cam R, latch L, and rod M, for the purpose of securing and holding the rake when retracted.

3. In combination with the rake E, latch L, and rod M, the movable cam P, for the purpose of controlling the operation of the rake.

4. In combination with the rake E, the check-plate H, for the purpose of arresting the motion of the arms C and D while the rake is sweeping the grain from the platform.

In witness whereof we have hereunto set our hands.

SAMUEL S. SHERMAN.
    JEREMIAH G. SHERMAN.

In presence of—
    PHILIP SUTTON,
    DENNIS FELLERS.